(No Model.)  2 Sheets—Sheet 1.
P. S. BROWN.
DISTRIBUTING BOX AND FUSE PLUG.
No. 554,438. Patented Feb. 11, 1896.
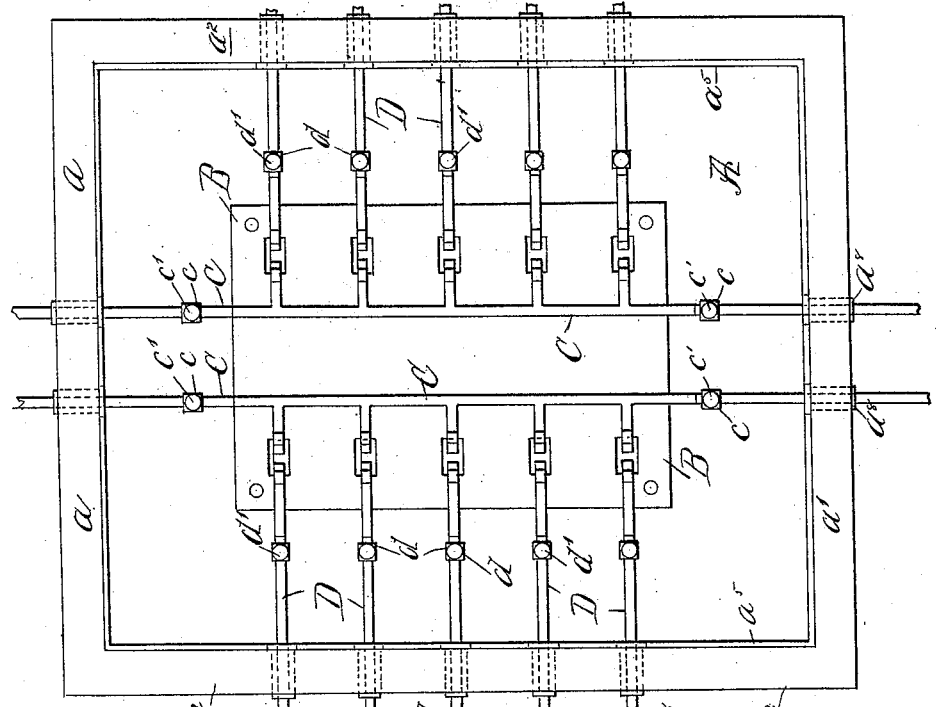
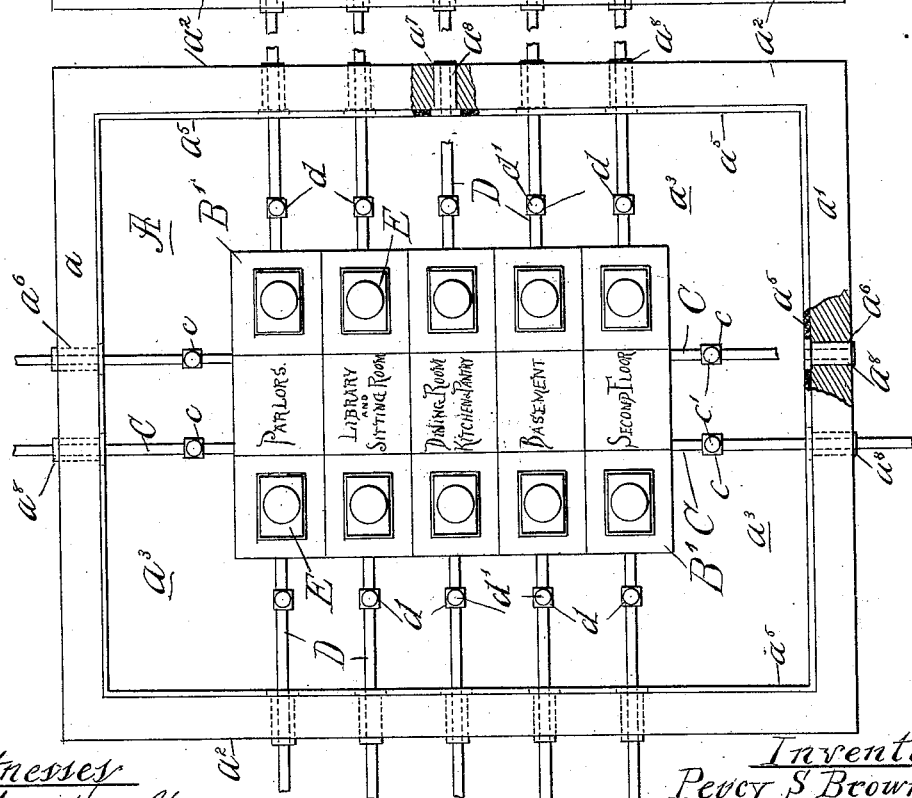
Witnesses
Clinton Hamlink
John W. Adams
Inventor
Percy S. Brown
by: Dayton Poole Brown
his Attorneys

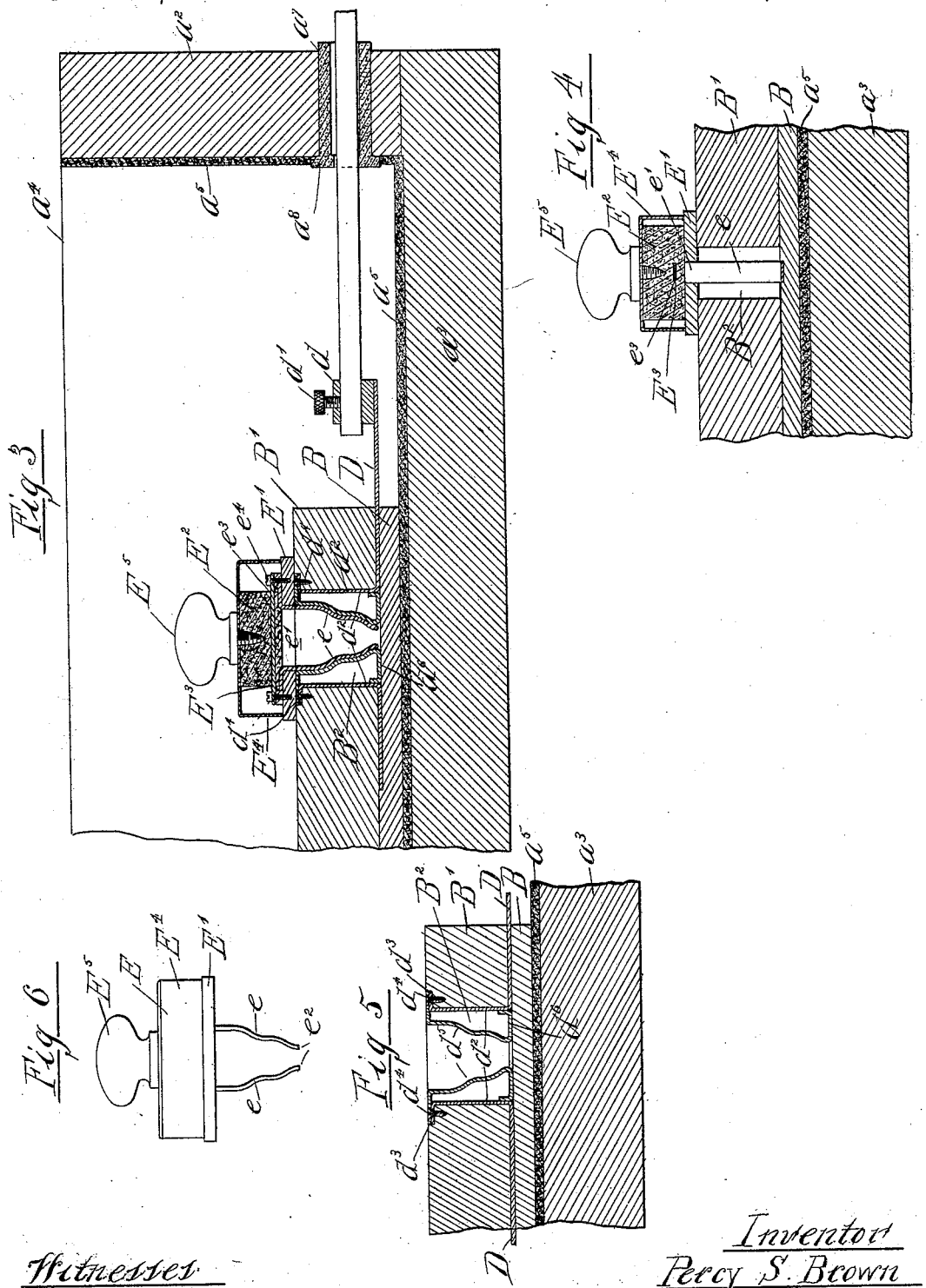

UNITED STATES PATENT OFFICE.

PERCY STRAWTHER BROWN, OF TOLEDO, OHIO.

DISTRIBUTING-BOX AND FUSE-PLUG.

SPECIFICATION forming part of Letters Patent No. 554,438, dated February 11, 1896.

Application filed April 19, 1895. Serial No. 546,296. (No model.)

*To all whom it may concern:*

Be it known that I, PERCY STRAWTHER BROWN, of Toledo, in the county of Lucas and State of Ohio, have invented certain new and useful Improvements in Distribution-Boxes and Fuse-Plugs Therefor; and I do hereby declare that the following is a full, clear, and exact description thereof, reference being had to the accompanying drawings, and to the letters of reference marked thereon, which form a part of this specification.

This invention pertains to improvements in devices for use in incandescent electric-light wiring and relates more specifically to improvements in a "distribution-box," and also to an improved fuse-plug adapted for use both as an adjunct to said distribution-box and independently of the same.

Heretofore electric wiremen in wiring a building have first ascertained the number of lamps to be used therein, apportioned these among such a number of independent circuits that the number of lamps on any circuit shall not exceed that permitted by the under-writer's rules, and then proceeded to make a rough-lumber distribution-box of suitable size and form to accommodate one of the terminals of each of said several circuits and a fuse-plug for each terminal. This is ordinarily a shallow rectangular box, open at the front and adapted to be fitted between two adjacent vertical studdings before the building is lathed and plastered, in which position it is secured with its front edges flush with the plastering-line. Suitable apertures are formed in the several sides of the box for the passage of the several conductors, and these apertures, as well as the entire interior of the box, are lined with some suitable fireproof material, usually asbestos. The main leads or supply-conductors are arranged to pass through the box. The fuse-blocks for the several circuits are screwed to the rear inner side of the box adjacent to the main conductors and connected with the latter by suitable branch wirings, while the terminals of the several lamp-circuits are connected with the opposite sides of the fuse-plugs and led out through the apertures in the sides of the box. After the plastering has been done a carpenter fits a suitable door or cover to the front side of the box.

It will be obvious from the foregoing that considerable time is expended first in making a suitable box and thereafter in making a great number of electrical connections between the main and branch conductors, between the branch conductors and fuse-blocks and between the latter and the ends of the several circuits. Furthermore, should one of the fuse-blocks be "blown" or the connection therein fused, it is necessary to call an electrician to replace it, inasmuch as the character of the work is so dangerous that it is seldom attempted nor should it be attempted by unskilled persons.

It is, therefore, one of the objects of my present invention to provide a distribution-box which is practically complete in all its details, wherein the number of electrical connections to be made are reduced to a minimum, and these connections may be made with the utmost facility.

Another object is to so construct the device that the several fuse-blocks and the terminal ends of the branch conductor may be easily unfastened from and lifted bodily out of the box in order that any necessary alterations or repairs may be more conveniently made, and this without breaking a single electrical connection unnecessarily.

A further object is to provide an improved form of fuse block and plug; and to these ends the invention consists in the matters hereinafter set forth and more specifically pointed out in the appended claims. It will be readily understood from the following description, reference being had to the accompanying drawings, in which—

Figure 1 is a front view of the distribution-box embodying my invention partially in section. Fig. 2 is a similar view with some of the parts removed. Fig. 3 is a vertical sectional view of a portion of the box taken through the fuse-plug. Fig. 4 is a similar view taken through the fuse-plugs, but at right angles to the section shown in Fig. 3. Fig. 5 is a sectional view similar to that shown in Fig. 3 with the fuse-plug removed. Fig. 6 is a detached view of the fuse-plug.

Referring to said drawings, the letter A designates as a whole a shallow rectangular box having top walls $a$ and bottom walls $a'$, side walls $a^2 a^2$ and a back $a^3$. As commonly used, this box will be constructed of suitable size and depth to fit between two adjacent vertical studs of the wall or partition of a building, in which position it will be properly secured with its open side outward and with the front or outer edges $a^4$ flush with the plastering-line of the wall. The interior of the box is lined with any suitable fireproof material $a^5$, preferably asbestos, and is also provided with apertures $a^6$ $a^6$ through its top and bottom walls for the passage of main conductors and with apertures $a^7$ through each of its sides $a^2$ for the passage of branch conductors, each of said apertures being also lined with a bushing $a^8$ of any suitable fireproof material.

B designates a false back or removable baseboard, somewhat smaller than the interior of the box A and suitably secured within the latter against the back $a^3$ thereof.

C C designate main conductors arranged to extend vertically across the base B, preferably, and, as herein shown, parallel with each other near the central part of the board. The conductors C C are of greater length than the base B so as to extend beyond the latter at each end and terminals at said ends in sockets $c$ and binding-screws $c'$, adapted to receive and secure the ends of the main conductor leading in through the top and bottom sides of the box.

D indicates a plurality of branch conductors arranged to extend laterally outward from each of the main conductors C, and also terminating at short distances beyond the edges of the base in sockets $d$ and binding-screws $d'$, similar to those of the main conductors C.

Preferably and as shown the main and branch conductors are made integral of flat strip metal (usually brass) which rests upon the top surface of the base B. A second board, B', is arranged to fit upon the base B, thus forming a protecting-covering for the main parts of the conductors, but leaving the several ends of the latter projecting from between the two.

Obviously the box thus constructed forms a complete device with which the main leads and any number of branch circuits, not greater than the number of branch terminals provided, may be connected with the greatest facility. It will be further obvious that any of the ordinary fuse-blocks now in common use may be used in connection with the box thus described. As an additional improvement, however, each of the branch terminals is shown as provided with a novel form of fuse-plug and contact devices therefor (indicated as a whole by E) constructed as follows:

$B^2$ indicates a rectangular aperture formed through the board B' at a point above the branch conductor between its juncture with the main conductor and the margin of the base B. The conductor D is severed at this point and each of the ends thereof turned upward at right angles against the opposite side walls of the aperture, as at $d^2$ $d^2$. The extreme ends $d^3$ $d^3$ of these strips are turned outwardly upon the upper surface of the board B', and are secured in this position by a screw $d^4$, or in any suitable manner.

$d^5$ $d^5$ designate spring-metal strips secured at their upper ends to or in direct metal contact with the portions $d^3$ $d^3$ of the conductor D, but so as to extend downward within the aperture $B^2$ and to converge toward each other and then turned horizontally outward away from each other at the bottom of the aperture, their extreme ends $d^6$ $d^6$ being bent at a right angle upwardly to form stops which are adapted to contact with the vertical parts $d^2$ of the strips D. The strips $d^5$ $d^5$ are arranged to normally spring toward each other in order to insure proper electrical contact with a pair of contact-strips $e$ $e$ mounted upon the fuse-plug proper, E, now to be described.

E' designates a base-block, preferably of hard rubber, somewhat larger than the aperture $B^2$ and provided with a central opening $e'$, through which depend the contact-strips $e$ $e$, the latter being secured to the upper side of the base E' at opposite sides of the aperture $e'$. The strips $e$ $e$ are arranged wedge shape, as illustrated, and normally will tend to resist compression, so that they will more readily fit snugly between the strips $d^5$ $d^5$ when the plug E is in proper position. Each of the pairs of strips are preferably corrugated transversely, as shown, so as to overcome the tendency of the spring action of the strips $d^5$ to throw the plug bodily outward.

$E^2$ designates a block of insulating material secured centrally upon the base E', of such length as to cover the aperture $e'$, but to leave the ends $e^2$ $e^2$ of the strips $e$ exposed, as shown more clearly in Fig. 3. The block $E^2$ is pierced transversely with an aperture $e^3$, through which is passed a fuse-wire $E^3$, suitably secured at its ends to the strips $e$ $e$ by means of binding-screws $e^4$ $e^4$, whereby the electrical circuit from one part of the conductor D to the other is completed when the plug E is in position.

$E^4$ designates a cap or cover of fireproof material, preferably of sheet-mica, arranged to extend over the block $E^2$ and rest at its lower margin upon the base E', thus completely inclosing the conductors of the plug.

$E^5$ designates any ordinary handle by means of which the plug may be inserted and withdrawn from its socket. As herein shown, said handle is provided with a screw which passes through the mica cap and into the block $E^2$, thus serving to secure both the handle and cap.

Obviously the particular form of the contacting devices illustrated, either of the plug or of the socket within which it fits, is not essential, and the same may be varied. The form herein shown is, however, novel and practical and is made the subject of specific claims.

As hereinbefore stated, the distribution-box herein described may be used either without fuse-plugs or in connection with fuse-plugs of different construction from that herein described, but forms when used in connection with my improved fuse-plug an improved combination which not only forms a simple and complete device, but greatly facilitates the repairing or re-fusing of the circuits in case of "blow-outs" and enables any one of ordinary skill to re-fuse the plugs without danger, inasmuch as the plug may be lifted out of the box entirely away from all wires. If the operator or owner of the building prefers, the plug may be taken to any electrician, rewired by him, taken home and pushed into place, thus repairing the device at a minimum cost by obviating the necessity of having an electrician proceed to the house and charge for his "time."

Obviously the form of plug and socket herein described may be adapted to various other uses, and when so used will possess most of the advantages hereinbefore described. I do not therefore wish to be limited to such details as are herein shown, except as claimed.

What I claim as my invention, and desire to secure by Letters Patent, is as follows:

1. A distribution-box for electric conductors, provided with suitable apertures in its sides through which the main and branch conductors may be passed, a block of less dimensions than the interior of the box secured to the inner side of the back of the box, sections of the main conductors secured to said block, each section having a desired number of branch conductors united to it, the free ends of said main and branch conductors projecting outwardly beyond the margins of said block, sockets on the projecting ends of said conductors, binding-screws in said sockets, and a fuse inserted in each of the branch conductors, substantially as and for the purpose set forth.

2. A distribution-box for electric conductors comprising a box having inclosing sides and back, apertures for main and branch conductors in said sides, a block, of less dimensions than the interior of the box, removably secured to the inner back wall of the box centrally thereof, a section of each of the two main conductors extending across and secured to said block in one direction, a plurality of branch conductor-sections integrally united to said main conductors and extending laterally outward therefrom, each of said conductor-sections extending beyond the margins of the block and being provided with a socket and binding-screw, and a fuse-plug inserted in each branch conductor at a point within the margins of the block, substantially as set forth.

3. A fuse-plug comprising a body, two insulated contact-pieces mounted thereon at opposite sides of the plug, the contacting surfaces of said contacts being arranged to converge in wedge form and provided with transverse corrugations, a fuse removably connecting said contact-pieces, and a fireproof cap inclosing the fuse-strip and ends of the contact-strips, substantially as set forth.

4. A fuse-plug comprising a base portion of insulating material, a pair of oppositely-arranged convergent contact-strips depending from said base, a block of insulating material resting upon the base, provided with an aperture therethrough, a fuse-strip extending through said apertured block and removably connected at each end with one of said contact-strips, and a handle secured to said block, substantially as set forth.

5. A fuse-plug comprising a base portion of insulating material provided with a central aperture, a pair of contact-strips secured to said base at opposite sides of, and arranged to depend through, said aperture, a block of insulating material secured upon the base, a fuse-strip extending between and secured at each end to one of the contact-strips, a fireproof cap resting upon said base and inclosing the upper ends of the contact-strips and fuse-strip, and a handle secured to the plug, substantially as set forth.

6. The combination with a base provided with a socket comprising two oppositely-arranged spring-contacts, of a fuse-plug comprising a base portion of insulating material, a pair of oppositely-arranged convergent contact-strips depending from said base, a block of insulating material resting upon the base, provided with an aperture therethrough, a fuse-strip extending through said apertured block and removably connected at each end with one of said contact-strips, and a handle secured to said block, substantially as set forth.

7. The combination with a base provided with a socket containing two oppositely-arranged, transversely-corrugated spring-contacts converging from their outer toward their inner ends, of a fuse-plug comprising a body, two insulated contact-pieces mounted thereon at opposite sides of the plug, the contacting surfaces of said contacts being arranged to converge in wedge form and provided with relatively shallow transverse corrugations, whereby said plug may be inserted or withdrawn from the socket without rotation and a fuse extending through the body of the plug and connecting said contact-pieces, substantially as set forth.

In testimony that I claim the foregoing as my invention I affix my signature, in presence of two witnesses, this 15th day of April, A. D. 1895.

PERCY STRAWTHER BROWN.

Witnesses:
JOHN MEYER,
A. E. FARNEN.